US005319337A

United States Patent [19]

Matsunari et al.

[11] Patent Number: 5,319,337

[45] Date of Patent: Jun. 7, 1994

[54] COMPOSITE MOLDING OF RESIN-BONDED MAGNET FOR MACHINE PARTS AND PROCESS FOR PRODUCING THE SAME

[75] Inventors: Yasunori Matsunari, Otsu; Toshiaki Ishimaru, Mooka; Yasushi Kakehashi; Shogo Miki, both of Mooka, all of Japan

[73] Assignee: Kanegafuchi Kagaku Kogyo Kabushiki Kaisha, Osaka, Japan

[21] Appl. No.: 863,240

[22] Filed: Apr. 3, 1992

[30] Foreign Application Priority Data

Apr. 5, 1991 [JP] Japan .................................. 3-102035
May 14, 1991 [JP] Japan .................................. 3-139749

[51] Int. Cl.[5] ........................ H01F 3/00; G03G 15/09; G03B 27/04

[52] U.S. Cl. .................................... 335/303; 118/657; 355/251; 355/118

[58] Field of Search ................ 335/303, 306; 355/251, 355/118, 252; 118/657, 658

[56] References Cited

U.S. PATENT DOCUMENTS 1,025,616 4/1966 Yamashita ........................... 335/303
4,496,303 1/1985 Loubier ............................... 335/303
4,587,699 5/1986 Kadomatsu ......................... 29/121.1
4,597,661 7/1986 Yamashita ........................... 118/657
4,662,311 5/1987 Shoji .................................. 118/658
4,689,163 8/1987 Yamashita ........................... 335/303
4,981,635 1/1991 Yamashita ........................... 264/112

FOREIGN PATENT DOCUMENTS 0128508 12/1984 European Pat. Off. .
0217966 4/1987 European Pat. Off. .
0429684A1 6/1991 European Pat. Off. .
0125497 3/1978 Japan .................................. 335/303
0183708 9/1985 Japan .................................. 335/303
60-173964 11/1985 Japan .
60-225179 11/1985 Japan .
60-229078 11/1985 Japan .

OTHER PUBLICATIONS

Patent Abstract of Japan, vol. 10, No. 24 (E-377) (2081) Jan. 30, 1986 & JP-A-60 182 705 (Yamauchi Gomu).

Patent Abstract of Japan, vol. 10, No. 302 (E-445) (2358) Oct. 15, 1986 & JP-A-61 115 305 (Yamauchi Rubber).

European Search Report, Application No. EP 92 10 5784, dated May 21, 1993, The Hague.

*Primary Examiner*—Leo P. Picard
*Assistant Examiner*—Stephen T. Ryan
*Attorney, Agent, or Firm*—Armstrong, Westerman, Hattori, McLeland and Naughton

[57] ABSTRACT

A machine part used as a magnet roll for developing and a process for producing the same. The machine part constitutes a member of a developing machine for an electrophotographic process such as a copier and facsimile, and a laser printer as well. The machine part comprises a shaft having a resin-bonded magnet layer provided on the outer periphery thereof. The composite molding of a resin-bonded magnet is produced by molding and establishing a composition for a thermoplastic resin-bonded magnet comprising from 35 to 60 % by volume of a thermoplastic resin and from 40 to 65 % by volume of a hard ferrite powder into a cylinder of uniform thickness on the outer periphery of a shaft, obtained is a thin resin-bonded magnet layer having a surface roughness of 5 μm or less and free of seams which have generated during molding, the thin resin-bonded magnet layer further having provided on the surface a plurality of magnetic poles at a small spacing.

11 Claims, 1 Drawing Sheet

COMPOSITE MOLDING OF RESIN-BONDED MAGNET FOR MACHINE PARTS AND PROCESS FOR PRODUCING THE SAME

BACKGROUND OF THE INVENTION

1. Field of the Invention

The present invention relates to a machine part used as a magnet roll for developing, which constitutes a member of a developing machine for electrophotographic processes, such as a copier and a facsimile, and a laser printer as well. It also relates to a machine part used as a field magnet rotor of motors and the like. More particularly, the present invention relates to a machine part and a process for producing the same, said machine part made of a composite molding of a resin-bonded magnet which comprises a shaft having a resin-bonded magnet layer on the outer periphery thereof.

2. Description of the Prior Art

Magnet rolls are used in the development systems of electrophotographic apparatuses such as copiers and facsimiles, as devices for transferring toner particles to a photoreceptor. In a most prevailing electrophotographic system, a magnetic body comprising a metallic shaft which penetrates through said body is inserted into a sleeve in a non-contact manner. Thus, by rotating the sleeve relative to the magnet roll, the image having produced on the surface of the sleeve by magnetic adhesion of the toner particles is transferred to the photoreceptor without bringing the sleeve into direct contact with the photoreceptor. However, this type of development is now being replaced by a process which use no sleeves. This novel developing process uses a magnet roll which comprises a cylindrical or drum-shaped metallic shaft having an outer periphery covered with rubber magnets being arranged in a layer, and having further thereon metallic hemispherical floating electrodes with smooth surfaces. More recently, these types of magnet rolls are further improved by replacing the outermost layer of the floating electrodes with a magnet layer having a finely finished surface and made of rubber magnets that are fixed and adhered. In the electrophotographic process using such magnet rolls, the toner is directly adhered magnetically on the finely finished surface of the magnet rolls. This is the so-called direct-contact type electrophotographic development process. For example, JP-A-63-223675 (the term "JP-A-" as referred herein signifies an "unexamined published Japanese patent application") discloses a novel development apparatus of this type. The apparatus comprises a member which carries and transfers a developer containing a one-component magnetic toner to the developing area, from the vicinity of the latent image carrier comprising the photoreceptor. In the apparatus of this type, the toner is attracted on the surface of a magnetic body which is incorporated on the outer periphery of the transfer member, said toner being charged by frictional electrification between the charging member and the magnetic body to establish a thin toner layer on the surface of the magnetic body. The thin toner layer is then carried with the rotation of the magnetic body to transfer the toner to the photoreceptor.

In the magnet roll described above, the magnet layer which is provided around the shaft at a thickness of about 1 mm is made of a rubber-based magnet comprising a rubber based binder having dispersed therein isotropic barium ferrite grains. A hard blade, to which pressure is applied, is also established against the surface of said rubber-based magnet roll, to control the amount of the toner to be carried thereon. The magnet roll is manufactured by kneading a rubber material with ingredients such as ferrites to give a sheet, and after winding the sheet around the metallic shaft, the whole structure is subjected to press molding at a high temperature, which is then finished by polishing the surface.

Conventional magnet rolls and field magnet rotors for motors have been manufactured by applying pressure to adhere or to fit the magnet molding with shafts, spacers, etc. Because of the significant improvement in the performance of resin-bonded magnets using thermoplastic resins, the rubber magnets were replaced by the resin-bonded magnets to increase productivity. Thus, the resin-bonded magnets are now widely manufactured by insertion molding the shaft into the thermoplastic resin-bonded magnet.

However, the product still suffers an insufficient strength at the boundary of bonding between the shaft and the resin-bonded magnet molding; this is because, in general, the shaft or other metallic members have poor affinity with the resin-bonded magnet composition, and because there is generated a residual strain at the thermoplastic molding of the magnet. In the case of extrusion insertion molding, for example, the resin-bonded magnet molding undergoes complete separation from the shaft, and thus the total performance as a machine part is greatly impaired. Accordingly, attempts have been made to improve the bonding strength of the magnet body with the shaft. Such attempts include forming surface irregularities or cuttings on the shaft, or coating the surface of the shaft with a thermosetting adhesive based on an epoxy resin or the like and then heat-treating the whole structure after inserting the shaft into the magnet body to allow solidification of the adhesive. Those treatments, however, require extra costs and manpower, and yet, are not satisfactorily efficient. Moreover, long machine parts such as magnet rolls for use in developing steps of electrophotographic processes accompany difficulties in carrying out the adhesion process.

In the case of field magnet rotors for use in motors, a high strength against rotational fracture and a resistance against falling off of the shaft along the longitudinal direction are required to the resin-bonded magnet layer. However, sufficiently high values are not obtained as yet with respect to the two requirements above.

As described in the foregoing, the conventional composite moldings of magnets for use as machine parts, which is represented by rubber magnet rolls, have been suffering disadvantages summarized below, and it has been desired to overcome those problems.

(1) Cracks or openings form in the magnet layer or openings generate between the shaft and the magnet layer due to insufficient adhesion, during the cross-linking process for modifying the rubber magnets and the high temperature pressing of rubber magnets against the shaft for adhesion; and non-uniform structure also forms because of accidental local drop of pressure at the pressing, and such a heterogeneous structure leads to the generation of gas bubbles at the vulcanization or cross-linking; the phenomena above cause partial fluctuation in the properties of the magnet rolls, such as in the magnetic field intensity, etc., which results in a developed image having uneven density when transferred on a paper. In the case of direct contact type electrophotographic development in which the magnet roll itself is charged, the charged properties of the magnet roll are important. However, sometimes fluctuations in charged properties occur ascribed to the residual chemicals used at the vulcanization and crosslinking of rubber, or to the presence of other impurities.

(2) In addition to the high viscosity of the rubber itself, the incorporation of a filler such as a ferrite powder into the rubber further increases the viscosity of the rubber composition to make the processing more difficult. Because this tendency becomes more pronounced with decreasing the average diameter of the ferrite grains, a ferrite powder composed of grains with larger grain diameter may be used to ameliorate the processing properties, however, larger ferrite grains increase the surface roughness of the magnet rolls. To improve the surface roughness, a fine-grained ferrite powder (morphologically anisotropic ferrite grains suffice this requirement) should be used in the expense of lowering the processability and increasing the processing torque; thus, limits were imposed in the practical process.

(3) Because the rubber materials are incorporated as bulk materials, the ferrite powder cannot be uniformly dispersed in the rubber irrespective of the grain size. This leads to a magnet molding having a distribution in the concentration of ferrite. Such a distribution in concentration of ferrite impairs uniform magnetization of the product.

(4) Because a ferrite powder composed of grains having a relatively large average diameter is used, stable quality cannot be obtained for the magnet molding due to the lack of a fine surface as desired and to the incorporation of coarse grains. This results in a developed image suffering non-uniform appearance.

(5) Pinhole defects occasionally generate on the surface of the magnet layer. Such defects impair both the uniform magnetization and the formation of a uniform surface.

(6) Because the roll is manufactured by winding a rubber sheet around the shaft and then pressure molding the resulting structure, the seam of the rubber tend to be insufficiently fused. Such insufficient adhesion disturbs uniform magnetic and electric properties, and leads to the formation of irregularly developed images.

In the light of the circumstances above, the present inventors have found that the use of a thermoplastic resin in the place of rubber can circumvent the majority of the problems enumerated hereinbefore, and have proposed the use of a flexible composition for resin-bonded magnet based on ferrites, said composition comprising as the binder, a mixture of a chlorinated polyethylene with an olefin/vinyl ester copolymer comprising from 20 to 40 % by weight of vinyl ester and having a melt index of 50 or higher. Such a composition for a thermoplastic resin-bonded magnet is characterized by: that it has a sufficiently high mechanical strength despite an inorganic magnet powder being incorporated at a high concentration; that it is free of compositional migration and adhesion at the boundary between the magnet layer thereof and an object to be brought into contact with the magnet layer; and that it has a low melt viscosity at the hot melt molding, and yet it has favorable molding characteristics.

Thus was obtained a magnet roll having significantly improved properties as compared with the previous rubber magnet rolls; however, the problem of density unevenness and the like in the developed image still remained to be solved, and thus was looked for a further improvement. Particularly among the problems summarized above, the sixth problem which arise in connection to the presence of a seam in the magnet sheet, i.e., disturbance of uniform magnetic and electric properties, was found impossible to be solved with a prior art process. Thus, an improved process was desired.

SUMMARY OF THE INVENTION

The present invention has been accomplished under such circumstances, and it provides a composite molding of a resin-bonded magnet for machine parts, and also a process for producing the same. The present invention is suitable for magnet rolls used in electrophotographic processes and for field magnet rotors of motors in which a strength against drop out of the shaft along the longitudinal direction is required, and yet suitable for mass production. The composite moldings of resin-bonded magnets for machine parts according to the present invention are specified in composition, dielectric constant, and surface roughness of the magnet layer, and are produced by specified processes, so that favorable surface properties, mechanical properties, electric properties, and magnetic properties can be achieved.

The present inventors conducted an extensive study to overcome the difficulties above and achieved the present invention. That is, the present invention provides machine parts made of composite moldings of a resin-bonded magnet suitable as magnet rolls for developing processes, which is characterized by that it comprises a shaft having established a composition for a thermoplastic resin-bonded magnet on the outer periphery thereof, said resin composition being molded into a cylinder of uniform thickness and established in such a manner to give a thin resin-bonded magnet layer, the surface roughness thereof is controlled to 5 μm or less and substantially free from seams having been generated during the molding, said magnet composition having a dielectric constant of 9 or higher and comprising from 40 to 65 % by volume of hard ferrite powder and from 35 to 60 % by volume of a thermoplastic resin, and said thin resin magnet layer comprising a surface to which a plurality of magnet poles are provided at a small spacing. The composite molding of a resin-bonded magnet for use as a machine part, representative of such being a magnet roll for use in a developing process, is produced by coating the surface of the metallic shaft with a thermally fused thermoplastic resin composition. By employing this particular production process, a seamless magnet roll having uniform magnetic and electric properties can be obtained, which is thereby suitable for use in a direct contact type electrophotographic process.

The electric properties of the magnet roll is subject to the moisture absorption and this also is a cause of maldevelopment. To avoid the absorption of moisture, the use of a hard ferrite powder obtained thorough a wet grinding process is preferred. From the viewpoint of avoiding formation of pinhole defects ascribed to the inclusion of coarse grains, more preferred is to use a powder composed of hard ferrite grains 1.3 μm or less in average diameter obtained by wet grinding, which is further classified using a sieve having a mesh opening of 24 mesh or finer, and collecting those grains having passed through such a sieve.

The deformation of the resin-bonded magnet layer during its use is also a subject of consideration, because hard platy blades, which are established by pressure welding, are provided in direct contact with the resin-bonded magnet layer. To avoid such deformation, it is preferable to use thermoplastic resin having a small compression set.

Segregation of ferrite grains which occur during the kneading of the dielectric material may cause fluctuation in the electric properties. From the viewpoint of avoiding such scattering in the electric properties, the use of a thermoplastic resin composed of grains 1 mm or less in diameter and having a rough surface is preferred.

It is preferred to increase the adhesion strength between the metallic shaft and the resin-bonded magnet layer, because the resin-bonded magnet layer has a poor affinity for the metallic shaft. This can be achieved by incorporating a thin layer of a thermoplastic adhesive between the thermoplastic resin composition for the magnet and the metallic shaft, provided that said thermoplastic adhesive has a hot melt temperature lower than the temperature of melt molding the composition for the resin-bonded magnet, so that the shaft and the composition for the resin-bonded magnet may be adhered at the insertion molding of the shaft with the composition for the resin-bonded magnet.

The surface roughness of the resin-bonded magnet layer according to the present invention should be controlled to 5 μm or less. Such a smooth surface is preferably attained by lathe turning, and not by polishing only. It is also preferred to effect lathe turning in combination with polishing.

The seamless magnet roll having an excellent adhesion strength between the resin-bonded magnet layer and the metallic shaft according to the present invention is obtained by coating the surface of the metallic shaft with a hot melt thermoplastic resin. More specifically, the composition for the resin-bonded magnet may be formed on the surface of the shaft by extrusion molding or insertion molding in accordance with an injection molding process, and then solidifying the thermoplastic resin which is in the molten state by cooling.

Another embodiment according to the present invention provides a composite molding of a resin-bonded magnet for use as a field magnet rotor of motors, which is characterized by that it comprises a metallic shaft having established a composition for a thermoplastic resin-bonded magnet established on the outer periphery thereof, said resin composition being molded into a cylinder of uniform thickness and established in such a manner to give a resin-bonded magnet layer substantially free from seams that have generated during the molding, said magnet composition comprising from 30 to 70 % by volume of hard ferrite powder and from 30 to 70 % by volume of a thermoplastic resin, and said resin-bonded magnet layer comprising a surface to which a plurality of magnet poles are provided at a small spacing. As in the magnet roll above, preferred embodiments for the magnet for use in the rotors comprise the features mentioned for magnet rolls, such as the use of hard ferrite powder composed of grains 1.3 μm or less in average diameter, the use of a thermoplastic resin powder composed of surface-roughened grains 1 mm or less in average diameter, and the joining of the resin-bonded magnet layer with the metallic shaft using a thin layer of a thermoplastic adhesive having a hot melt temperature lower than the melt molding temperature of the composition for the thermoplastic resin-bonded magnet. Since the surface of the resin-bonded magnet layer need not be brought into contact with other members in the case of the composite molding of the resin-bonded magnet for use as a field magnet rotor of motors, the surface smoothing treatment using lathe-turning and the like is unnecessary, but a moderate surface roughness is desired so long as it would not impair the magnetization properties.

Other objects, features, and advantages of this invention will become apparent from the following description, the accompanying drawings the appended claims.

DESCRIPTION OF THE PREFERRED EMBODIMENTS

The composite molding of a resin-bonded magnet for machine parts according to the present invention and the process for producing the same- are described in further detail below referring to the accompanying drawing and the examples.

Figure 1:
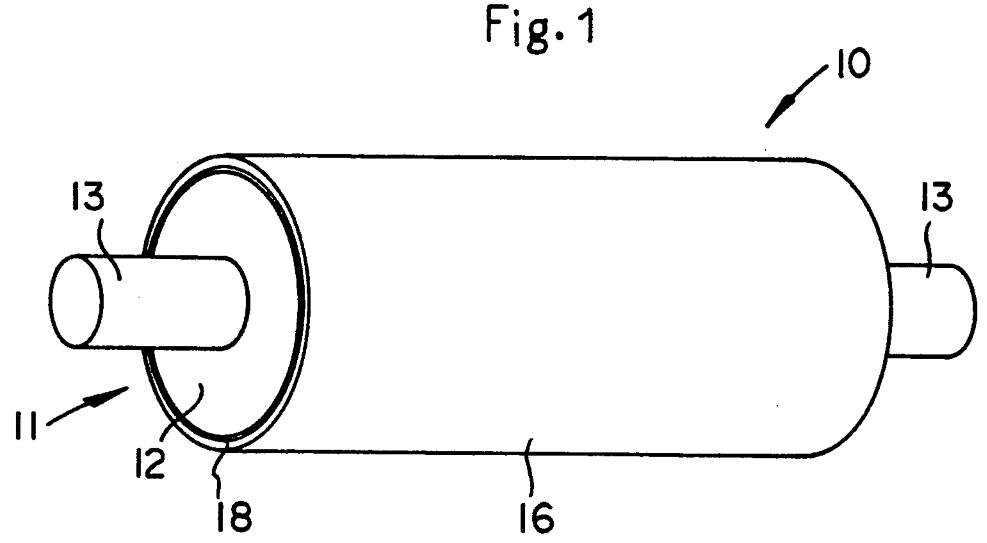
FIG. 1 is a perspective view of a magnet roll in accordance with the present invention.
Figure 2:
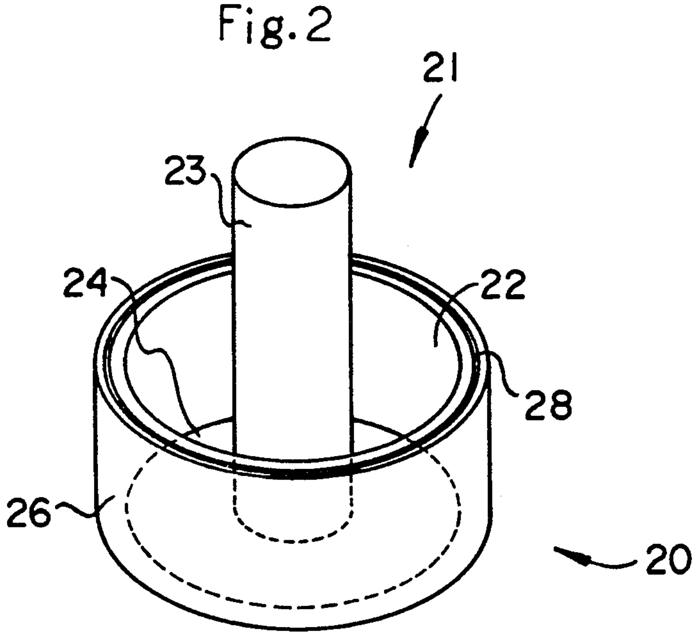
FIG. 2 is a perspective view of a field magnet rotor for electric motors in accordance with the present invention.

Several preferred embodiments of the present invention are shown in the drawings. In FIG. 1, shown is magnet roll 10 for use in electrophotographic process which comprises shaft 11 having a large diameter portion 12 and two projecting smaller diameter end portions 13. Resin-bonded magnet 16 is secured to the outer periphery of large diameter portion 12 of shaft 11 by intermediate thermoplastic resin adhesive layer 18. In FIG. 2, shown is field magnet rotor 20 for use in an electric motor which comprises shaft 21 having a large diameter portion 22 and a projecting smaller diameter end portion 23 connected to the large diameter portion by web 24. Resin-bonded magnet 26 is secured to the outer periphery of large diameter portion 22 of shaft 21 by intermediate thermoplastic resin adhesive layer 28.

The shaft to be used herein is a member having a high elastic modulus made of metals, ceramics, and the like. The thermoplastic resin composition for the resin-bonded magnet to be molded together with the shaft by insertion molding comprises a thermoplastic resin and a powder of a magnetoplumbite type ferrite as the major components, having added therein if necessary, a plasticizer, a stabilizer, a lubricant, a surface treating agent, and other additives for modifying the properties of the composition. The ferrite powder is obtained by pulverizing bulk barium ferrite or strontium ferrite into grains of several micrometers (μm) or less in size. The ferrite powder imparts magnetism to the resin composition, or increases the dielectric constant of the composition. To intensify the magnetic characteristics of the molding, a composition comprising from 60 to 70 % by volume of ferrite powder having a strong anisotropy is molded under a magnetic field or under application of a mechanical shear to obtain a one-direction grain-oriented structure. In general, the determination of the blending ratio for the ferrite powder and the selection between an isotropic or an anisotropic ferrite powder are made properly according to the desired magnetic characteristics. A general use composite molding of a resin-bonded magnet for field magnet rotors of motors and the like may contain from 30 to 70 % by weight of a ferrite powder, if the required magnetic and molding characteristics are considered.

In the case of a composite molding of a resin-bonded magnet for magnet rolls which are used in direct contact type electrophotographic processes, a composition for thermoplastic resin-bonded magnet is established on the outer periphery of a metallic shaft to cover the whole periphery and length thereof to give a cylinder-like molding of uniform thickness, which is then processed in such a manner to give a seamless thin resin-bonded magnet layer the surface roughness thereof is controlled to 5 μm or less, and a plurality of magnet poles arranged at a small spacing is further established thereon. The thin resin-bonded magnet composition used herein has a dielectric constant of 9 or higher and comprises from 40 to 65 % by volume of hard ferrite powder and from 35 to 60 % by volume of a thermoplastic resin. The magnet roll produced in this particular manner comprises a resin-bonded magnet layer having an excellent adhesion to the shaft, and the surface thereof is free of seams.

The composite molding of a resin-bonded magnet for machine parts according to the present invention and the process for producing the same are explained in further detail below. In the following descriptions, special reference is made to a magnet roll for use in electrophotographic processes in which strict electric and magnetic properties as well as surface smoothness are required; however, it should be understood that the present invention is not only limited thereto.

1. MATERIALS TO BE USED

Thermoplastic Resin

The thermoplastic resin to be used in the present invention is selected from among a variety of resins according to the desired purposes. Examples of such resins include the general use resins, i.e., polypropylene, ethylene/vinyl acetate copolymers, 6-polyamide, 12-polyamide, plasticized vinyl chloride resin, chlorinated polyethylene, polyethylene terephthalate, polybutylene terephthalate, and polyphenylene sulfide. In the case of injection molding the composition for the thermoplastic resin-bonded magnet, a crystalline resin is preferred from the viewpoint of the mechanical strength of the resulting molding, whereas a non-crystalline resin is generally preferred for use in extrusion molding.

In the course of designing the thermoplastic resin to be used as the binder, the present inventors were concerned first with controlling the deformation of the resin-bonded layer of the magnet roll used in developing processes, which deformation being caused by the blade which is brought into contact under pressure with the magnet roll, and thought of lowering the compression set.

In general, chlorinated polyethylene resins (referred to hereinafter as "CPEs") are used as a thermoplastic binder resin for flexible magnets having a rubber elasticity. However, since those widely used CPEs are obtained by uniformly chlorinating polyethylene over the whole polyethylene chain and hence they have no nodes at which the high molecular chains are combined in the solidified state, the CPEs suffer permanent set when subjected to a continuous stress. The permanent set may be decreased to some extent by increasing the chlorination degree, but such an increase in chlorine content reversely impairs the processability of the material to a practically unfeasible degree.

The present inventors have studied extensively the means for reducing the permanent set without impairing the processability. As a result, it has been found that the use of a partially chlorinated polyethylene, i.e., a polyethylene resin with some crystalline portion left unchlorinated in the polyethylene chain, as a binder resin for the ferrites enable the production of a flexible magnet molding having a small compression set maintaining a favorable processability. This effect is presumably due to the presence of nodes which result from the crystallization of the crystalline polypropylene portions after molding and solidifying, which function as the vulcanized portions in rubber. The permanent set is too large for a partially CPE with a crystallization degree of less than 10 %, whereas with a crystallization degree of over 20 %, the modulus of the resulting partially CPE becomes too high presumably due to the excess amount of residual crystalline portion in polyethylene. Thus, the crystallization degree of the partially CPE preferably is controlled to a range of from 10 to 20 %.

The composition for a thermoplastic resin-bonded magnet comprising from 40 to 65 % by volume of hard ferrite powder and from 35 to 60 % by volume of the partially CPE mentioned above as the resin binder can be easily molded; it also provides a favorable magnet roll having small compression set and free of deformation despite the presence of a blade brought into contact with the roll under pressure. The amount of the ferrite powder added to the composition should be in the range of from 40 to 65% by volume, because an addition of the ferrite powder below 40 % by volume results in a magnet roll having insufficient magnetic properties and too low dielectric constant, while increasing excessively the volume resistivity; on the other hand, an addition of the ferrite powder in excess over 60 % by volume impairs the processability of the composition and results in a resin-bonded molding having somewhat poor adhesion of the shaft or having a non-uniform texture.

The description above was made specifically on CPE, but the same applies to other thermoplastic resins so long as they have low compression set, and they can provide a resin-bonded magnet layer having excellent properties.

As well as the compression set above, the next point to be considered for a thermoplastic resin to be used as the binder is how to prevent the ferrite powder from segregation. More specifically, there are problems as follows in using a resin composition comprising a plurality of resins.

(1) When a resin powder blend is fed to the hopper of a kneading and extruding machine for kneading and pelletizing the composition, segregation of the low density resin particles occurs with respect to the upper layer portion, upon stirring and the like of the blend inside the hopper. Thus, the resulting molding suffers compositional variation within a single molding because the composition of the molding produced at the initial stage of extrusion greatly differs from that at the final stage of extrusion; and (2) Segregation of ferrite powder occurs due to difference in density within a mixture comprising coarse resin particles and fine-grained ferrite powder. To obtain a uniform dispersion comprising coarse granular resin particles free from such segregations, an intense kneading at a high temperature or a repetition of kneading processes is required, however, such measures call forth problems of thermal degradation of the resin and lowering of production efficiency.

It has been well known that a problem of change in electric characteristics occurs when the composition were to be kneaded under a high temperature for a long time while applying an intense shear force, ascribed particularly to the thermal degradation of the resin. It has been now found that the use of a thermoplastic resin composed of surface-roughened particles is effective to avoid the change in electric properties without lowering the production efficiency. It is more preferred that the resin powder material is wholly composed of grains 1 mm or less in diameter. That is, if a powder material composed of grains having a smooth surface were to be used, separation phenomena tend to occur within the powder blend in accordance with the difference in density; the present inventors have found that a blend of homogeneous composition can be realized by finely pulverizing the powder blend and surface-roughening the constituent grains at the same time. This signifies increasing the intergranular friction between differing grains to maintain a favorable mixing state within a blender and to obtain a composition for a resin-bonded magnet having a uniform composition. By thus size-reducing the resin material into surface-roughened powder grains, a uniform composition can be obtained even in minute areas; at the same time, the intergranular friction can be increased by the roughened surfaces of the grains. In such a manner the compositional separation phenomena within a powder blend, which is apt to cause at the handling (i.e., at the stirring and transportation) of the blend, can be avoided.

Furthermore, the pulverization of the resin powder facilitates the production of a homogeneous powder dispersion from two binder resins differing in compatibility without subjecting them to an intense kneading, and, at the same time, it allows the ferrite powder composed of surface-roughened grains to be maintained more easily in the structure built by the resin grains to give a fine dispersion of ferrite powder within the blend. The points above are effective for stabilizing both the electric and magnetic characteristics of the powder blend. If the resin powder were to be composed of grains larger than 1 mm in diameter, the composition which results after kneading and pelletizing tend to fluctuate and yields a magnet roll having a local compositional difference within a single roll. It is preferred, accordingly, to control the grains of the resin powder to 1 mm or less in diameter, from the viewpoint of avoiding compositional scattering within a single molding. However, even with a powder composed of grains 1 mm or smaller in diameter, spherical grains such as those produced by granulation, which thereby have smooth surfaces, tend to have a low intergranular friction and thereby tend to cause large compositional fluctuation. Thus, the most important point for the prevention of heterogeneous composition is to control the shape and the surface roughness of the individual grains.

Ferrite Powder

The ferrite powder to be used in the present invention is a powder of a barium ferrite or strontium ferrite which is used as materials for permanent magnets. Preferably, anisotropic ferrite powder composed of minute grains from 0.8 to 1.3 μm in average diameter and free of coarse grains is best suited for use in the present invention. The anisotropic ferrite powder in general is obtained by prolonged grinding and contains less coarse grains as compared with the isotropic ferrite powder. Thus, the use of an anisotropic ferrite powder is preferred to an isotropic ferrite powder.

Even in the production of a resin-bonded layer using a thermoplastic resin in the place of rubber, there are some instances in which pinhole defects occur. Such pinhole defects impair uniform magnetization or surface smoothness of the resin-bonded magnet layer.

As a result of an extensive study performed by the present inventors on the factors which cause the surface defects of the magnet rolls, it has been found that the origin of such defects resides in the ferrite powder conventionally used in the resin-bonded magnet layer. The conventional ferrite powder had been produced by roughly eliminating gigantic particles by sieving a fine-grained ferrite powder obtained through a dry- or wet-grinding process, using a sieve having a mesh opening around 10 mesh. The use of such a rough sieving can be reasoned by the poor fluidity of the ferrite powder which yields an extremely low efficiency at the sieving process, however, such a rough classification results in a powder comprising coarse grains which unfavorably influences the surface roughness of the magnet roll produced therefrom.

Accordingly, a study was made to find a favorable ferrite powder for use in the present invention. As a result, it has been found that a favorable ferrite powder can be obtained by wet grinding, said powder composed of grains 1.3 μm in diameter, and more preferably, those further passed through a sieve having a mesh opening of 24 mesh or finer. This can be explained as follows. The bulk ferrite before crushing is an aggregate composed of crystal grains, having ionic impurities concentrated at the grain boundaries. By crushing the bulk ferrite to grains having a preferable size for the present invention, i.e., to grains 1.3 μm or less in granularity, the grain boundaries become exposed on the surface of individual grains. Thus, the ionic impurities at the grain boundaries influence the resin-bonded magnet, in such a manner by lowering the electric resistance or by making it unstable. In the case of wet grinding a bulk ferrite, such ionic impurities are eluted to the grinding medium, i.e., water, that the electric resistance stabilizes at a high value. Accordingly, ferrite powder obtained by wet grinding is preferred for the magnet roll according to the present invention from the viewpoint of stabilizing the charge characteristics. The ferrite powder for use in field magnet rotors of motors preferably is composed of grains 1.3 μm or less in average diameter. However, in this case, also useful in addition to the powders obtained by wet grinding are those finely pulverized by dry grinding; furthermore, the powder not necessarily be passed through a sieve having an opening of 24 mesh or smaller in the case of producing the rotors.

The use of the fine-grained ferrite powder described above enables rolls free from pinhole defects and further improved in stability of the electric properties. That is, the change in electric properties ascribed to change in humidity conditions or aging is significantly suppressed.

The resin-bonded magnet layer of the magnet roll according to the present invention is produced by kneading from 35 to 60 % by volume of the aforementioned thermoplastic resin with from 40 to 65 % by volume of hard ferrite powder. As mentioned hereinbefore, the ferrite powder should be added into the blend at an amount of from 40 to 65 % by volume, because an addition below 40 % by volume is insufficient for the realization of desirable magnetic characteristics. On the other hand, an addition in excess over 65 % by volume unfavorably impairs the processability of the material, and, it also impairs the adhesion strength and homogeneity of the molding to some extent. Furthermore, the dielectric constant of the resin-bonded magnet layer should be controlled to 9 or higher. If the dielectric constant were to be 9 or lower, the resulting image would suffer too low image density.

The resin-bonded magnet layer for use in the field magnet rotor of motor according to the present invention is produced by kneading from 30 to 70 % by volume of the aforementioned thermoplastic resin with from 30 to 70 % by weight of a hard ferrite powder.

Thermoplastic Adhesive

The thermoplastic adhesive to be used in the present invention to improve adhesion strength of the thermoplastic resin-bonded magnet layer to the shaft preferably is a diluted solution type such as those based on vinyl chloride, acrylic resins, and nitrile rubber, which can be applied to the object to give a thin film of uniform thickness. However, the adhesives for use in the present invention are not limited thereto and also useful are other types of adhesives such as hot melt adhesives, provided that they can be applied to the shaft to give a thin film of uniform thickness.

The thermoplastic resin adhesives for use in the present invention include, for example, poly(vinyl acetate), poly(vinyl formal), poly(vinyl butyral), ethylene/vinyl acetate copolymer, vinyl chloride/vinyl acetate copolymer, poly(butyl methacrylate), vinyl chloride/butyl acrylate copolymer, and soluble Nylon. Analogously, also useful are those based on a thermoplastic resin adhesive and containing minor amount of a thermosetting resin adhesive, i.e., the so-called composite adhesives. Preferably, the thermal plasticizing temperature of those thermoplastic resin adhesives are not higher than the thermal deformation temperature of the compositions for thermoplastic resin-bonded magnets according to the present invention.

2. PRODUCTION PROCESS

Molding

In the molding of a composition for a thermoplastic resin-bonded magnet composed of a thermoplastic resin, particularly the thermoplastic resin having a small compression set mentioned above, and a ferrite powder, a problem arises concerning the poor adhesion strength of the resin-bonded magnet layer to the metallic shaft, because the composition has, by nature, an excellent non-adhesiveness. Such a drop in adhesion strength induces fracture to occur more readily at the boundary between the surface of the metallic shaft and the resin-bonded magnet layer. When such rolls comprising a resin-bonded magnet layer being poorly adhered to the metallic shaft are subjected to peripheral grinding using lathe turning or to surface finishing by polishing, adhesion failure such as peeling off occurs to the resin-bonded magnet layer having formed on the metallic shaft. Even worse, when such magnet rolls are mounted on a copier and the like, the resin-bonded magnet layer sometimes undergoes separation by the shearing stress which is exerted between the resin-bonded magnet layer and the metallic shaft at the instant a rotational force is applied to the shaft. Particularly the surface of the resin-bonded magnet layer is apt to suffer such a phenomenon because a pressure is applied thereto by means of a doctor blade. When a resin-bonded magnet layer undergoes separation as mentioned above in a copier and the like, the magnetized pattern is displaced and cause an irregular pattern density on the developed image. Furthermore, those rolls suffering poor adhesion strength between the resin-bonded magnet layer and the metallic shaft sometimes disable their practical use as field magnet rotors of motors, ascribed to the drift which have caused by the repeated action under high torque and an intense accelerated rotational motion between the shaft and the resin-bonded magnet layer.

The present inventors have found that the incorporation of a thin film of an adhesive at a uniform thickness on the surface of the metallic shaft increases the adhesion strength of the resin-bonded magnet layer to the metallic shaft, and that it is therefore effective for the circumvention of such inconveniences. In the magnet rolls, however, the resin-bonded magnet layer functions as the magnetic dielectric and hence it is important to stabilize the dielectric constant and the electric properties such as volume resistivity. Thus, the incorporation of such a thin adhesive layer between the metallic shaft and the resin-bonded magnet layer may greatly affect the electric properties. However, it was found effective to reduce the thickness of the adhesive layer as thin as possible to incorporate it as a thin film which has minimum influence on the electric properties, and to make it a film of uniform thickness to thereby control the local fluctuation in the electric properties. Such an adhesive layer improves the adhesion strength and stabilizes the electric properties of the roll as well.

The coated thickness of the thermoplastic resin adhesive depends on the resin-bonded magnet layer, but a thickness of 100 μm or less is preferred from the viewpoint of its influence on the electric properties. Moreover, it becomes difficult to form a layer of uniform thickness if the adhesive layer were to be made thicker. Accordingly, in thicker adhesive layers, local fluctuation in the electric properties tend to occur. The adhesive layer may be formed by any method as desired so long as a thin film of the adhesive may be formed at a uniform thickness, but methods such as roller coating, spray coating, brush coating, and dip coating are the methods which can be most readily practiced.

In the present invention, the use of a thermoplastic resin enables production of magnet rolls using known injection coating(insertion)/molding and extrusion coating(insertion)/molding processes. The use of such methods advantageously realizes uniform magnet rolls improved in adhesion strength, and this adhesion strength can be further enhanced by additionally forming an adhesive layer on the surface of the shaft. Thus, the problem of causing separation between the shaft and the resin-bonded magnet layer can be solved.

The use of a thermoplastic resin is further advantageous in that the moldability of the composition is improved. The composition can be stably molded even with the addition of ferrite powders composed of minute grains from about 0.8 to 1.3 μm in average diameter. Accordingly, magnet rolls having improved surface roughness can be produced. Furthermore, since a composition comprising a homogeneously dispersed ferrite powder in a thermoplastic resin can be readily produced, a magnet roll having uniform material properties can be produced. Such a magnet roll is advantageous in that a uniform magnetization can be obtained even though it is fine-pitched. This enables multipolar magnetization as desired, comprising from 40 to 50 poles.

In addition to the insertion molding (coating/molding) mentioned above to be used in establishing the resin-bonded magnet layer on the outer periphery of the shaft, cuttings and surface irregularities may be provided to the surface of the shaft. Otherwise, as mentioned hereinbefore, the shaft surface may be coated with a thermosetting adhesive such as the one based on epoxy resin and the like, and then heat treated to solidify after inserting the shaft into the roll body. The processes mentioned above, however, require an extra cost and manpower, and yet not sufficiently effective. In the case of a magnet roll, in particular, the treatment of long members further makes the adhesion process difficult.

Such a disadvantage can be avoided by insertion molding the shaft having been coated with a thin film of a thermoplastic resin adhesive, together with a molten composition for the thermoplastic resin-bonded magnet, and then cooling the whole structure to obtain a solidified product. In such a manner the composite molding and the hot melt adhesion can be effected at the same time. In the process above, the following points are preferred: that the hot melt temperature of the thermoplastic resin adhesive is lower than the melt molding temperature of the composition for the thermoplastic resin-bonded magnet; that the adhesive layer having been applied to the surface of the shaft is once dried to obtain a thin film of the thermoplastic resin adhesive; that the adhesive-coated shaft made of a metal and the like is pre-heated to a temperature not higher than, but at the vicinity of, the hot melt temperature of the coated thermoplastic resin adhesive to thereby effect the insertion molding; and that the thermoplastic resin adhesive layer is provided to give a thickness of not more than 100 μm.

The joining and insertion molding above can be simultaneously effected by extrusion molding using a crosshead die or by injection molding using a metal mold equipped with a grip mechanism which holds the shaft.

The composition for the resin-bonded magnet may additionally contain various additives such as silane- or titanate-based coupling agents to further increase the adhesion strength of the ferrite powder to the resin, lubricants and plasticizers to improve moldability and to impart flexibility to the composition, and stabilizers to avoid degradation of the composition during the molding process.

The hot melt temperature of the thermoplastic resin adhesive is preferably not higher than the thermal molding temperature of the composition for the thermoplastic resin-bonded magnet according to the present invention. By thus designing the thermoplastic resin adhesive, the thermoplastic resin adhesive which melts upon heating the composition for the resin-bonded magnet at the thermal molding realizes a tight bonding of the shaft with the adhesive, and the adhesive with the composition for the resin-bonded magnet. Thus the hot melt adhesion and the composite molding can be effected at the same time.

If the adhesive layer were to be provided too thick on the shaft, the strength of the structure at high temperatures tends to decrease; preferably the adhesive layer is provided as a thin film having a thickness of about 100 μm or less. Furthermore, if the adhesive layer becomes too thick as to a thickness of 100 μm or more, the coating process, solution coating for example, finds inconveniences because it requires handling of viscous solution, repetition of coating, and the like. Moreover, an adhesive layer about several micrometers in thickness provides sufficient adhesion strength. Thus, the adhesive need not be provided as an excessively thick layer. To establish the adhesive layer as a thin film on the surface of the shaft, emulsion coating and solution coating are the preferred ones, and most preferred is the solution coating because emulsion coating sometimes yields unfavorable coatings due to the presence of inclusions which originate from the dispersants, emulsifiers, and other agents, or due to the formation of pinhole defects. Moreover, the layer provided by emulsion coating sometimes become a little too thick. Hot melt coating is not preferred because it tends to yield too thick a layer. The solution coating process can be effected according to the ordinary process, which comprises coating the shaft with an adhesive solution prepared at a desired concentration.

In conducting the simultaneous process of composite molding and hot melt adhesion, the shaft to be inserted at the molding is preferably pre-heated, because if a shaft at the ordinary temperature were to be inserted into a molten composition for the thermoplastic resin-bonded magnet, the surface of the molten composition to be brought into contact with the cold surface of the shaft tend to be locally cooled at the instant of contact, and hence the thermoplastic resin adhesive may not be sufficiently heated to the hot melt temperature. This may result in an unsatisfactory adhesive strength. Thus, the shaft having coated with the adhesive is most preferably heated to a temperature near to the hot melt temperature of the adhesive. If a composition for the thermoplastic resin-bonded magnet were to be molded at a temperature higher than the hot melt temperature of the adhesive by 100° C. or more, a particular pre-heating as mentioned above is unnecessary, but the pre-heating is especially effective when the hot melt temperature of the adhesive is in the vicinity of the molding temperature of the composition. The pre-heating is particularly effective when a voluminous shaft having a large heat capacity is to be used, because the temperature elevation of the adhesive layer provided on the surface of such a shaft becomes even more sluggish. For example, in a magnet molding (field magnet rotor) attached to a shaft for use in motors, the composition for the resin-bonded magnet in general is melt molded in the temperature range of from 260° to 300° C., which is far higher than the hot melt temperature of a general use thermoplastic resin adhesive which is in the range of from 60° to 120° C. Moreover, the shaft has a small heat capacity and the diameter thereof is as small as about several millimeters at maximum. Thus, in this case, the shaft bonded to the magnet molding attains a high joint strength without being pre-heated. In contrast, a magnet roll for use in direct contact developing process must be produced by extrusion insertion molding which involves pre-heating the shaft. In this case, a composition for the resin-bonded magnet should be established at a thickness of about 1 mm by insertion molding at a temperature in the vicinity of from 120° to 160° C. on a metallic shaft of from about 15 to about 30 mm in diameter. It can be seen that the molding temperature is low and that the heat capacity of the shaft is large, and hence pre-heating is requisite. If the pre-heating were to be effected at a temperature not lower than the thermal plasticization temperature of the adhesive, the handling of the shaft to the molding machine upon supply thereof accompanies difficulty. Thus, the pre-heating temperature preferably is set not higher than the hot melt temperature of the adhesive. If the pre-heating were to be effected at too low a temperature, the effect of preheating cannot be appreciated. Thus, the pre-heating temperature should be set at a pertinent temperature by taking into account the melt molding temperature of the composition for the resin-bonded magnet, the hot melt temperature of the adhesive, and the heat capacities of the shaft to be inserted and the magnet portion. It can be seen that the present invention is not effective for the molding of rubber magnets which are molded at a considerably low temperature, because rubber magnets having insufficient bonding strength result from the present invention. To achieve favorable bonding strength with a rubber magnet, other complicated process should be taken.

It should be noted that when field magnet rotors for use in motors comprise shafts of larger diameters, the pre-heating process again becomes effective for improving the adhesion strength.

The simultaneous process for composite molding and hot melt adhesion introduced herein can be applied to various thermoplastic molding processes. It can be applied to heat compression molding as well, but the efficiency at the heat-compression insertion molding itself is yet to be improved. The process according to the present invention is suitable for molding processes having high productivity, such as extrusion molding and injection molding. In the case of extrusion molding, a crosshead die is advantageously used to conduct the composite insertion molding at a high efficiency. According to the process, the shaft having a surface coated with an adhesive layer is inserted into the opening of the die from the direction making a right angle with respect to the extruder so that it may be continuously coated with the composition for the thermoplastic resin-bonded magnet, which have been molten and supplied from the extruder. In the case of injection molding, the process comprises: establishing a shaft having coated with an adhesive layer at a defined portion in a metal mold; sealing the metal mold and injecting a molten composition for the thermoplastic resin-bonded magnet into said metal mold; and after cooling the melt for a predetermined duration to solidify, releasing the resulting molding. Thus can a desired molding be obtained, which is composed of a shaft being tightly bonded with the resin-bonded magnet layer.

A field magnet rotor for use in motors is preferably produced by injection coating molding a composition for thermoplastic resin-bonded magnet comprising a crystalline resin as the binder.

The present invention is explained in further detail below referring to Examples which illustrate the properties obtained on composite resin-bonded magnets for use as machine parts according to the present invention, said magnets being obtained by composite insertion molding of a shaft with a composition for thermoplastic resin-bonded magnet, incorporating therebetween a thermoplastic resin adhesive. In the following Examples, all parts and percentages are by weight unless otherwise stated.

EXAMPLE 1

A mixture comprising 800 parts of barium ferrite powder composed of grains 1.1 μm in average diameter, 100 parts of an ethylene/vinyl acetate copolymer, 3 parts of -aminopropyldimethoxysilane, and 0.5 parts of a phenol-based stabilizing agent (IRGANOX® No. 1098, a product from Ciba Geigy Co., Ltd.) was mixed in a rotary blade mixer and kneaded in an extruder maintained at a temperature of 230° C., to obtain a pellet of the composition for a resin-bonded magnet. A stainless steel shaft 3 mm in diameter and 50 mm in length was coated with a thermoplastic resin adhesive comprising a 5 % ethylene/vinyl acetate solution and dried, in such a manner that the front end of the shaft for a length of 20 mm may be covered with the adhesive coating. The resulting shaft was then set in a metal mold having a supporting mechanism which holds the shaft at the center thereof. Then the composition for the resin-bonded magnet was injection molded into this metal mold from an injection molding machine having set at a temperature of 270° C., to thereby obtain a resin-bonded magnet molding 30 mm in diameter and 20 mm in length, comprising a shaft having insertion molded therein. The strength of the shaft upon its drawing along the longitudinal direction was sufficiently high for practical use, which yielded 12.3 kg.

COMPARATIVE EXAMPLE 1

A resin-bonded magnet molding comprising a shaft having insertion molded therein was produced following the same procedure as in Example 1, except that no adhesive coating was provided on the surface of the shaft. The strength of the shaft upon its drawing along the longitudinal direction was low, yielding a practically unfeasible value of 3.4 kg. If a resin-bonded magnet molding of this size were to be multipolar magnetized to obtain a rotor magnet (field magnet rotor) for a stepping motor, at least a rotational fracture strength of 2 kg/cm and a strength of the shaft against drawing along the longitudinal direction of 6 kg are required. The resin-bonded magnet molding having a shaft obtained in Example 1 yielded a sufficiently high strength as compared with the required value, but it is obvious that the strength of the molding obtained in Comparative Example 1 is far below the required value.

Examples 2 to 5, Comparative Examples 2 and 3

A thermoplastic resin adhesive solution was prepared by dissolving a thermoplastic resin obtained by radical polymerization of 70 % of vinyl chloride monomer with 30 % of vinyl acetate monomer, into methyl ethyl ketone at a concentration of 5 %. The adhesive thus obtained had a hot melt temperature of 120° C. A resin mixture comprising 70 % of chlorinated polyethylene, 29.5 % of an ethylene/vinyl acetate copolymer, and 0.5 % of a phenol-based anti-oxidizing agent was mixed at an amount of 40 % by volume with 60 % by volume of barium ferrite in a mixer. The resulting mixture of barium ferrite and resin was kneaded at 120° C. in a hot roll mill to obtain a kneaded composition for a thermoplastic resin-bonded magnet. A stainless steel shaft 20 mm in diameter and 300 mm in length was coated with the adhesive solution prepared above, and was dried at 50° C. for 20 minutes to obtain an adhesive layer 6 μm in thickness. The surface of the adhesive-coated shaft was extrusion coated at 140° C. with the composition prepared above for the resin-bonded magnet at a thickness of 1 mm, using an extruder equipped with a crosshead die. Some of the molding processes were conducted using pre-heated shafts, and the other molding processes were conducted without pre-heating the shafts. In this case, the molding was too long that the strength of the shaft at drawing and the rotational fracture torque, which were measured in Example 1, could not be measured. Thus, the adhesion strength of the resin-bonded magnet layer to the shaft was evaluated by observing the state of adhesion upon forcibly peeling off the resin-bonded magnet layer from the shaft. The occurrence of a breakage in the resin-bonded magnet layer due to a sufficiently high adhesion strength was evaluated as material breakage (MB), and the other cases were collectively evaluated as layer-separation breakage (LB). The results are summarized in Table 1 below.

Comparative samples were produced in the same procedure as above, except that the shafts were not coated with the adhesive layer. The results are shown as Comparative Examples 2 and 3 in Table 1 below, but it can be seen that unfavorable results were obtained because of the poor adhesion strength of the resin-bonded magnet layer on the shaft.

TABLE 1

| Example Nos. | Pre-heating Temperature (°C.) | State of Adhesion | Peeling off Strength |
|---|---|---|---|
| Examples | | | |
| 2 | None (25° C.) | Fair | Partially MB,* Partially LB |
| 3 | 40 | Fair | Partially MB, Partially LB |
| 4 | 60 | Fair | MB |
| 5 | 80 | Fair | MB |
| Comparative Examples | | | |
| 2 | None (25° C.) | Edge separation | LB, easily peeled |
| 3 | 80 | Edge separation | LB, easily peeled |

Note *:
MB = material breakage; LB = layer-separation breakage.

As shown in Table 1, the shafts having no adhesive layers thereon (Comparative Examples 2 and 3) showed an extremely poor adhesion strength of the resin-bonded magnet layer to the shaft and were far from being practical. It can be seen that pre-heating had no effect on such cases. The resin-bonded magnet layer formed on the shaft coated with an adhesive layer, which was the case for Examples 2 to 5 according to the present invention, showed a favorable adhesion strength. The samples of Examples 4 and 5, in which the molding temperature for the composition of resin-bonded magnet was near to the hot-melt temperature of the adhesive, showed particularly the effectiveness of pre-heating. The shaft was pre-heated to 140° C. and then subjected to the molding. Despite the fact that the adhesive-coated shaft caused adhesion with the base at the entrance of the crosshead die and had some difficulties during the molding process, the adhesion strength of the resin-bonded magnet layer to the shaft was favorable for both samples, as was in the other Examples according to the present invention.

EXAMPLE 6

A plasticized adhesive was prepared from the adhesive obtained in Example 3, by adding 20 parts of dioctyl phthalate to 80 parts of resin content. The same molding process of Example 3 was followed except for using the newly prepared adhesive solution, and the adhesion strength of the resin-bonded magnet layer was evaluated. A fair adhesion state was observed as in Example 3, and the peeling off strength was further ameliorated that the layer-separation breakage which occurred previously in a part of the bonding occurred this time wholly as a breakage of the magnet material. This is an evidence showing the effectiveness of pre-heating, because the hot melt temperature of the thermoplastic resin adhesive was lowered in this case by adding a plasticizer, and thus the effect of pre-heating became more pronounced at a lower temperature.

Comparative Example 4

The same procedure of Example 4 was followed to obtain a magnet molding comprising an adhesive-coated shaft, except that the composition for the resin-bonded magnet was molded at 110° C. A layer separation was found to generate on the resin-bonded magnet layer at the edge portion of the shaft, and layer-separation breakage was observed to occur upon evaluation of the peeling off strength. Thus was found that hot melt adhesion was not effected in this case.

EXAMPLE 7

A resin mixture comprising 20 % of styrene, 40 % of methyl methacrylate, 35 % of butyl acrylate, and 5 % of acrylonitrile, was dissolved into methyl ethyl ketone at a concentration of 5 %. Roll moldings were produced following the procedures used in Examples 3 to 5, except that the newly prepared methyl ethyl ketone solution above was used in the place of the previous adhesive. The evaluations on adhesion strength of the resin-bonded magnet layer of the roll moldings thus obtained yielded favorable results as in Examples 3 to 5, and the peeling off breakage occurred as a breakage of the material.

Surface Machining

The resin-bonded magnet layer produced above should be finished to a give a smooth surface having a surface roughness of 5 μm or less to use as a magnet roll suitable for a developing process. First, the present inventors attempted to finish the surface of the magnet layer by polishing in accordance with the process used for finishing rubber magnets. However, the interstices of the grinding stone were filled with the material of the thermoplastic resin-bonded magnet at the polishing and caused such a stubborn blinding that the grinding stone was not useful any more. Thus, it has been found that the polishing process alone cannot serve as an industrially feasible process. Also, the amount polished in a single step was too small.

As an alternative process for smoothing the surface of the resin-bonded magnet layer, the present inventors thought of employing lathe turning. It is particularly preferred to carry out the lathe turning in two steps, i.e., coarse processing and finish processing. It is further preferred to conduct surface polishing after the lathe-turning, and most preferable is to effect the polishing using a sand paper.

In carrying out the surface turning using a lathe, the lathe turning machine itself should be modified so that the vibration caused by the lathe, by the peripheral vibration sources, or by the dimensional irregularity of the magnet roll itself may not influence the turning operation, because such vibrations produce irregularities on the machined surface.

More specifically, a magnet roll comprising a surface having a ferrite-based resin-bonded magnet layer established thereon can be finished into a roll having a smooth surface free from run-outs and waviness, with a surface roughness of several micrometers or lower by the use of a lathe whose vibration is reduced and controlled. However, it has been found that portions having rough surface occasionally develop on a magnet roll when a roll having a considerably large run-out is subjected to lathe turning. The reason for this was extensively studied, and, as a result, it has been found that this unfavorable phenomenon occur more frequently on magnet rolls having larger run-outs and waviness. Conclusively, it has been found that magnet rolls having a smooth surface can be stably obtained by preliminarily turning the surface of the magnet roll prior to the finish turning. The run-outs and waviness can be reduced in this way.

It has been found further that the finish turning subsequent to the preliminary turning can avoid the formation of partial coarsening on the surface. This finish turning may be replaced by polishing, and either of the processing methods provides a favorable surface. What is more advantageous in such a process is that the polishing can be effected in an industrially feasible manner with minimum consumption of the abrasive materials, because the major part on the surface can be removed by lathe turning prior to the polishing. The use of a sand paper, in particular, considerably reduces the cost of the abrasives; a high speed polishing without taking any special care on the abrasives can be effected by gradually drawing out a long and wide sand paper in accordance with the progressive polishing. It is most preferred that the polishing is effected on a favorable surface having obtained by a preliminary turning and a subsequent lathe turning.

In producing field magnet rotors for use in motors, the surface roughness of the resin-bonded magnet layer need not be strictly controlled. Thus, as is described hereinafter in the process of manufacturing rotors by winding a resin-bonded magnet sheet around a shaft, only a minimum surface machining to erase the seam is applied to such machine parts.

Magnetization

The composite resin-bonded magnet thus produced for use as a magnet roll in a developing process must be magnetized at a fine spacing so that the toner particles may be uniformly adsorbed thereon. Furthermore, the thickness of said resin-bonded magnet layer must be controlled as thin as possible because, by principle, the friction-charged toner particles must be transferred on the latent image formed on the photoreceptor by an electrostatic force, and, in doing so, the surface of the roll must be directly imparted an electric potential. Accordingly, if the resin-bonded magnet layer were to be provided too thick, an unfavorable developed image would result. The resin-bonded magnet layer must on the other hand function as a permanent magnet which absorbs the toner particles. But, if the layer were to be made too thin, the surface magnetic field would become too weak to maintain the toner particles on the surface of the layer. The present inventors have solved those problems conflicting with each other by controlling specifically the thickness of the resin-bonded magnet layer and the spacing of magnetization.

The material, which can be considered as a dielectric, possesses dielectric characteristics intrinsic to the material. Thus, those characteristics cannot be altered by changing the peripheral structures. Changing the dielectric properties of the material constituting the roll surface is not realistic, because it requires total change of the dielectric properties of the peripheral materials. Thus, to achieve the object of the present invention, the magnet performance of the layer must be more fully exhibited. The most simple way of doing so is to increase the ferrite concentration in the resin-bonded magnet layer, but such a measure increases the dielectric constant while decreases the electric resistivity of the layer. Such a change in properties of the layer is not desirable because it calls forth a total re-designing of the material and the developing apparatus. Another measure for improving the magnet characteristics is to impart radiant anisotropism to the magnet roll by using anisotropic ferrite powder and orienting the ferrite grains. The magnet roll can be rendered anisotropic along a radiant direction by magnetic field orientation molding, but this process cannot be applied to long-shaped moldings having a considerably large side area with respect to the cross sectional area, because the magnetic field along the radiant direction becomes too weak in such a case. Mechanical orientation can be mentioned as another means for rendering the roll anisotropic. In this process, special-use ferrite powder for shear orientation is used and rolled with the resin composition into a thin sheet, to obtain a grain-oriented sheet rendered anisotropic along the thickness direction of said sheet. The resulting anisotropic sheet is then wound around a shaft to obtain a magnet roll having imparted a radiant anisotropism. However, this process is still disadvantageous in that the degree of anisotropism is largely dependent on the fluctuation in visco-elastic properties of the binder resin and the rubber used, or on the properties of the ferrite powder. Thus, the magnetic properties obtained as a result become considerably unreliable. Considering that the magnet rolls for use in the developing of a direct contact type electrophotographic process take advantage of the magnetic field on the roll surface, the toner absorption properties are greatly influenced by the fluctuation in the magnetic properties of the roll material. Thus, the magnet rolls obtained by the mechanical orientation again, cannot be used with reliability. For field magnet rotors of motors, on the other hand, the magnet layer is effectively rendered anisotropic by applying either a magnetic field or mechanical shear orientation method to the ferrite powder. When the rotor above is produced by preparing first a grain-oriented sheet containing ferrite grains oriented along the thickness direction of the sheet by applying a mechanical shear and then by winding the resulting sheet around a shaft, lathe turning is included as an essential step for substantially removing the seam from the surface.

The present inventors have extensively studied a process for producing magnet rolls having excellent magnetic and electric properties by effectively drawing out the potential magnetic properties of the resin-bonded magnet layer, instead of altering the intrinsic electric properties (e.g., dielectric properties and electric resistivity) of the resin-bonded magnet layer, i.e., without changing the materials. Accordingly, the magnetic circuit of the magnet rolls was studied. As a result, magnet rolls which are satisfactory in both magnetic and electric properties were successfully obtained by setting the thickness of the resin-bonded magnet layer to a range of from 50 to 100 % of the spacing of magnetization.

When a multipolar magnetization is applied to a sufficiently thick magnet, N- and S-poles appear in turn on the surface of the magnet, and the magnetic field having generated on each of the poles is effectively utilized through a horseshoe magnetic circuit having developed inside the magnet. However, when the magnet is not thick enough, a penetrating magnetization occur on the back of the magnet layer. That is, a S-pole generates right behind a surface N-pole, and vice versa. Thus, the result as a whole is a considerably weak N-pole, because the magnetic field having generated on the surface N-pole is somewhat canceled by the magnetic field having generated by the back S-pole. Considering that a magnet roll comprises a thin resin-bonded magnet layer, it is well acceptable that an insufficiently weak magnetism results when the core shaft is made of a non-magnetic body, such as of aluminum, non-magnetic stainless steel, and synthetic resin.

Accordingly, the magnet roll according to the present invention comprises a magnetic shaft, so that the resin-bonded magnet layer may be established on this shaft. The use of a magnetic shaft is effective in two aspects. Firstly, on the magnetization of the resin-bonded magnet layer, the magnetic field which generates from the magnetization yoke magnetizes the shaft. Thus, the resin-bonded magnet layer can be magnetized from the surface and the back, as if magnetic fields for magnetization were provided at both the back and the surface. It is therefore possible to provide a stronger and effective magnetic field for magnetization as compared with the case only a single magnetization yoke is used. Accordingly, the resin-bonded magnet layer is strongly magnetized over the thickness because the magnetic field penetrates from the surface to the back. Another advantage in using a magnetic shaft is the increase of the surface magnetic field. As mentioned above, a thin resin-bonded magnet layer in general suffers lowering of the surface magnetic field when a penetrating magnetization occur. However, in this case, the magnetic energy having provided by the penetrating magnetization can be effectively utilized to intensify the surface magnetic field. That is, the reverse pole having generated on the back of the magnetized surface develops a magnetic field which is then fluxed through the magnetic circuit having established inside the shaft core, as if a thick horseshoe magnet were present instead of the thin resin-bonded magnet layer.

As described in the foregoing, the present invention provides a magnet roll suitable for use in photographic developing steps of a direct contact type electrophotographic process, as a composite molding of a resin-bonded magnet for use as a machine part. The magnet roll according to the present invention stably provides a uniform electric and magnetic characteristics over the whole roll, and is improved in moldability by the use of a thermoplastic resin in the composition for the resin-bonded magnet. Accordingly, the magnet roll of the present invention can be favorably put on mass production.

The use of a hard ferrite powder composed of fine grains 1.3 μm or less in average diameter produced by a wet-grinding process, and optionally classified with a sieve having a mesh opening of 24 mesh or even finer, is effective to considerably suppress changes in electric properties and generation of surface defects ascribed to the aging and the change in environmental moisture.

The use of a thermoplastic resin having a small compression set provides, in the case of magnet rolls which are used in developing apparatuses for example, a resin-bonded magnet layer well resistant to the pressure exerted by the blade which is brought into constant contact with the resin-bonded magnet layer.

The use of a thermoplastic resin powder composed of surface-roughened particles 1 mm or less in diameter enables a powder mixture comprising ferrite grains uniformly dispersed in the binder, which is more favorable for providing stable electric and magnetic properties.

Magnet rolls having an excellent surface smoothness can be stably obtained in an industrially feasible process by lathe turning the resin-bonded magnet layer or by smoothing said surface by combining lathe turning and polishing.

On insertion molding the shaft and the resin-bonded magnet layer to obtain a composite, the surface of the shaft may be previously coated with a thin film of a thermoplastic resin adhesive having a hot melt temperature lower than the melt molding temperature of the composition for the thermoplastic resin-bonded magnet. Such a process enables composite molding simultaneously with the hot melt adhesion to give a machine part made of a composite molding of a resin-bonded magnet, said molding comprising a resin-bonded magnet layer tightly adhered to the shaft free from layer separation. By thus improving the adhesion of the resin-bonded magnet layer to the shaft, magnet rolls free from developed image defects ascribed to the layer separation of the resin-bonded magnet layer from the shaft can be provided. Furthermore, rotor magnets freed from fear of breakage upon application of a rotational drive force can be obtained as well, and these rotor magnets can be produced easily and stably without applying special machining to the shaft for reinforcement.

The pre-heating of a shaft made of a metal and the like and having provided thereon a thin film of a thermoplastic resin adhesive to a temperature near to the hot-melt temperature but not higher than that, realizes a further improved tight adhesion between the shaft and the resin-bonded magnet layer.

While the invention has been described in detail and with reference to specific embodiments thereof, it will be apparent to one skilled in the art that various changes and modifications can be made therein without departing from the spirit and scope thereof.

What is claimed is:

1. A composite molding of a resin-bonded magnet for use as a machine part, said machine part comprising a shaft having a resin-bonded magnet layer provided on the outer periphery thereof, and being a magnet roll used for developing and which constitutes a member of a developing machine for an electrophotographic process, wherein, said composite molding of a resin-bonded magnet is produced by molding and establishing a composition for a thermoplastic resin-bonded magnet comprising from 35 to 60% by volume of a thermoplastic resin and from 40 to 65% by volume of a hard ferrite powder into a cylinder of uniform thickness on the outer periphery of a shaft having a thin layer of a thermoplastic resin adhesive thereon, said thermoplastic resin adhesive having a hot melt temperature lower than a melt molding temperature of the composition for the thermoplastic resin-bonded magnet, to thereby obtain a thin resin-bonded magnet layer having a surface roughness of 5 μm or less and free of seams which have generated during molding joined to the shaft by the thermoplastic resin adhesive, and said thin resin-bonded magnet layer has a surface further having provided thereon of plurality of magnetic poles at a small spacing.

2. The composite molding of a resin-bonded magnet for use as a machine part as claimed in claim 1, wherein said shaft is made of a magnetic metal.

3. The composite molding of a resin-bonded magnet for use as a machine part as claimed in claim 1, wherein said composition for the thermoplastic resin-bonded magnet has a dielectric constant of 9 or higher.

4. The composite molding of a resin-bonded magnet for use as a machine part as claimed in claim 1, wherein said hard ferrite powder is composed of fine grains 1.3 μm or less in average diameter and having obtained by wet grinding.

5. The composite molding of a resin-bonded magnet for use as a machine part as claimed in claim 1, wherein said hard ferrite powder is composed of fine grains 1.3 μm or less in average diameter, having obtained by wet grinding and further classified and passed through a sieve having a mesh opening of 24 mesh or finer.

6. The composite molding of a resin-bonded magnet for use as a machine part as claimed in claim 1, wherein said thermoplastic resin has a small permanent set.

7. The composite molding of a resin-bonded magnet for use as a machine part as claimed in claim 1, wherein said thermoplastic resin is composed of surface-roughened resin particles 1 mm or less in diameter.

8. The composite molding of a resin-bonded magnet for use as a machine part as claimed in claim 1, wherein the surface of said resin-bonded magnet layer is smoothed by lathe turning or by surface machining which comprises a combination of lathe turning and polishing.

9. A composite molding of a resin-bonded magnet for use as a machine part, said machine part comprising a shaft having a resin-bonded magnet layer provided on the outer periphery thereof and being a field magnet rotor for use in motors, wherein, said composite molding of a resin-bonded magnet is produced by molding and establishing a composition for a thermoplastic resin-bonded magnet comprising from 30 to 70% by volume of a thermoplastic resin and from 30 to 70% by volume of a hard ferrite powder into a cylinder of uniform thickness on the outer periphery of a shaft having a thin layer of a thermoplastic resin adhesive thereon, said thermoplastic resin adhesive having a hot melt temperature lower than a melt molding temperature of the composition for the thermoplastic resin-bonded magnet, to thereby obtain a resin-bonded magnet layer free of seams which have generated during molding joined to the shaft by the thermoplastic resin adhesive, and said resin-bonded magnet layer has a surface having provided thereon a plurality of a magnetic poles at a small spacing.

10. The composite molding of a resin-bonded magnet for use as a machine part as claimed in claim 9, wherein said hard ferrite powder is composed of fine grains 1.3 μm or less in average diameter.

11. The composite molding of a resin-bonded magnet for use as a machine part as claimed in claim 9, wherein said thermoplastic resin is composed of surface-roughened resin particles 1 mm or less in diameter.

* * * * *